United States Patent
Takeshita et al.

(10) Patent No.: US 7,679,321 B2
(45) Date of Patent: Mar. 16, 2010

(54) POWER CIRCUIT

(75) Inventors: Junji Takeshita, Atsugi (JP); Yasuhiro Tokumaru, Atsugi (JP); Kouichirou Sakamoto, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 134 days.

(21) Appl. No.: 11/298,213

(22) Filed: Dec. 9, 2005

(65) Prior Publication Data

US 2006/0209578 A1    Sep. 21, 2006

(30) Foreign Application Priority Data

Mar. 16, 2005    (JP) .............................. 2005-075920

(51) Int. Cl.
*H02J 7/00* (2006.01)
(52) U.S. Cl. .................. 320/114; 713/300; 320/112
(58) Field of Classification Search ......... 320/110–114; 713/300
See application file for complete search history.

(56) References Cited

U.S. PATENT DOCUMENTS

| 4,617,533 | A | * | 10/1986 | Paulik ..................... 331/113 A |
| 5,583,384 | A | * | 12/1996 | Henry ......................... 307/113 |
| 6,130,518 | A | * | 10/2000 | Gabehart et al. ............. 320/103 |
| 6,281,457 | B1 | * | 8/2001 | Chang ......................... 200/547 |
| 7,373,529 | B2 | * | 5/2008 | Nishida et al. ............... 713/300 |
| 2005/0007072 | A1 | * | 1/2005 | Krieger et al. ............... 320/131 |
| 2005/0174710 | A1 | * | 8/2005 | Masui et al. ................... 361/92 |

FOREIGN PATENT DOCUMENTS

| JP | 2002/300256 | | 10/2002 |
| WO | 2004/075371 | A1 | 9/2004 |

* cited by examiner

*Primary Examiner*—Edward Tso
*Assistant Examiner*—Samuel Berhanu
(74) *Attorney, Agent, or Firm*—Ladas & Parry LLP

(57) ABSTRACT

A power circuit is disclosed which is connected to a power source supplying different currents. The power circuit supplying driving power from the power source to a load includes a switching unit configured to switch the driving power supplied to the load in response to an external switching signal.

5 Claims, 8 Drawing Sheets

FIG.4
(A)
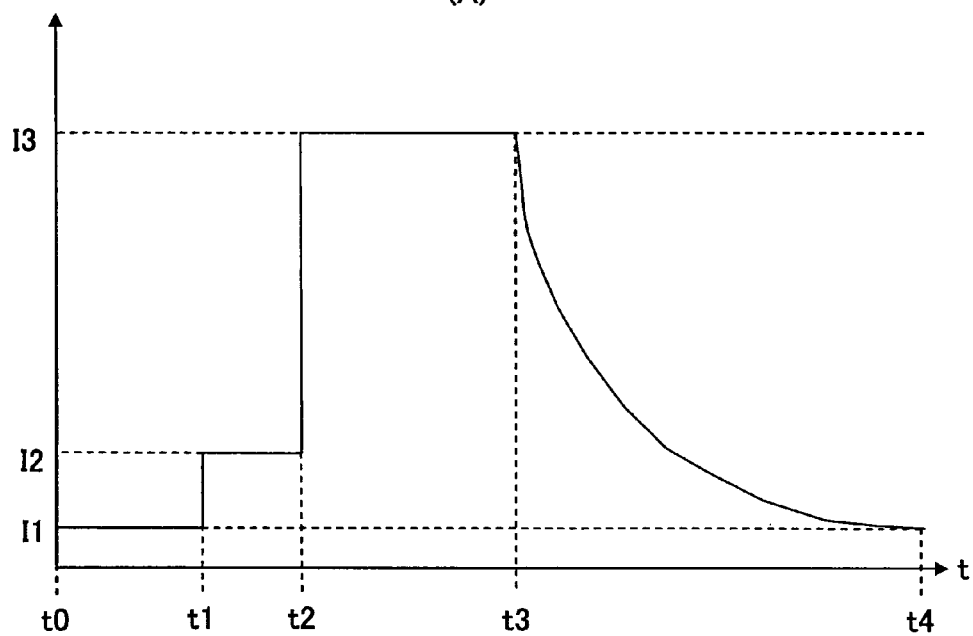
(B)
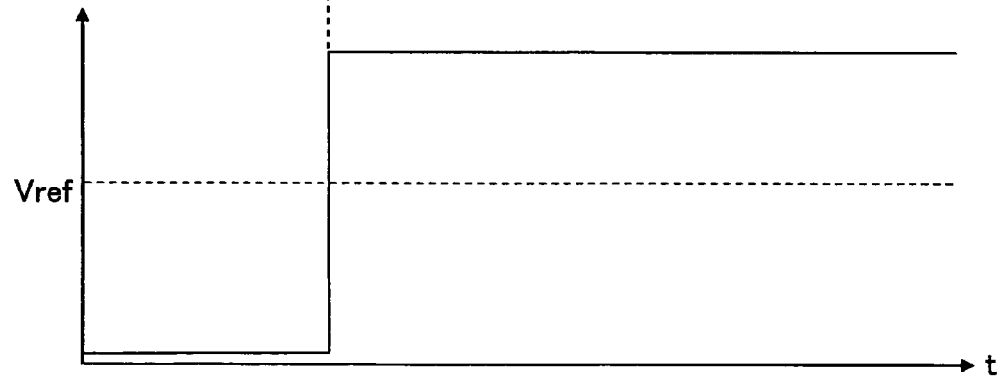

FIG.8
(A)
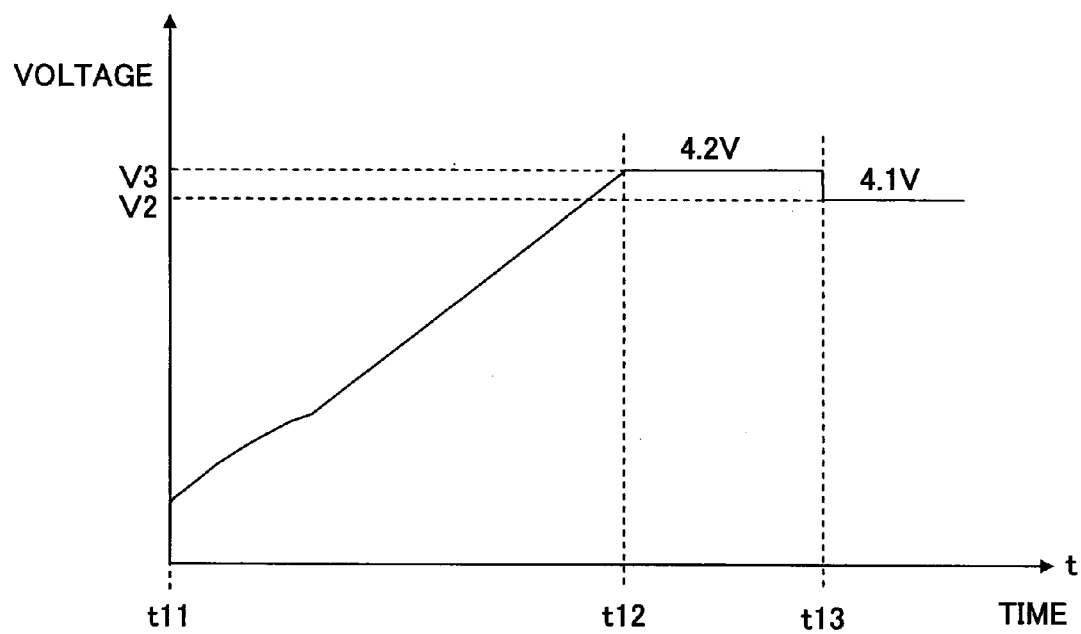
(B)
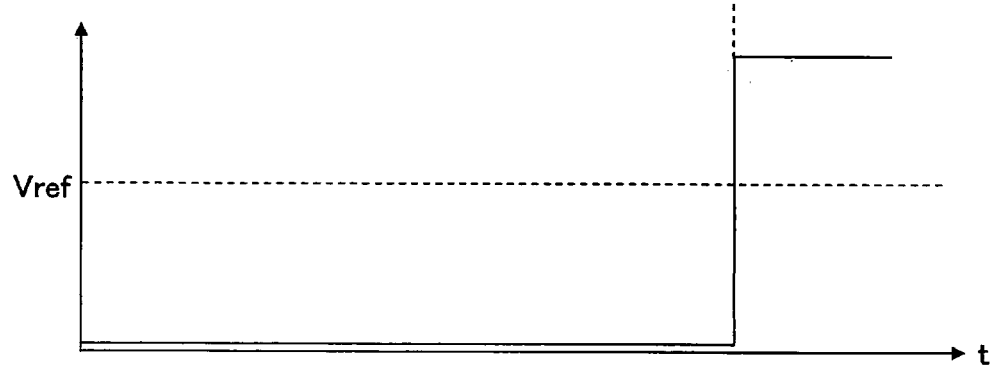

POWER CIRCUIT

BACKGROUND OF THE INVENTION

1. Field of the Invention

The present invention generally relates to a power circuit, and especially to a power circuit supplying power to a load.

2. Description of the Related Art

In recent years, there has been a demand for devices such as a cell phone, a portable music player, and a digital camera utilizing digital data to cooperate with a personal computer. Accordingly, the devices such as a cell phone, a portable music player, and a digital camera include a USB port having high general-purpose properties. Therefore, the devices such as a cell phone, a portable music player, and a digital camera can be directly connected to the personal computer.

The devices such as a cell phone, a portable music player, and a digital camera are normally driven by batteries. In a case where these devices are used while they are connected to the personal computer, when transmitting data, the batteries may die out (become discharged). Thus, a system may shut down, and there is a risk of losing the data being transmitted. Accordingly, when using these devices while they are connected to a personal computer, the power is supplied to the devices from a commercial power source. After an alternating current supplied from the commercial power source is converted to direct current by an AC adapter, the direct current is supplied to the batteries and the systems.

It is indispensable to connect the AC adapter to these kinds of devices. Thus, they are inconvenient in operability and portability. Accordingly, a system is desired which can supply power to the batteries and systems without the AC adapter.

As for a system enabling power supply to the batteries and systems without the AC adapter, Japanese Laid-Open Patent Application Publication No. 2002-300256 discloses a method of obtaining power from a power line such as an interface, e.g., USB, and supplying the power to the systems.

Accordingly, the interface such as USB includes plural abilities of supplying power. For example the interface includes a spec (specification) that the supply of electric current is 100 mA or less. On the other hand, in another spec the supply of electric current is at least 500 mA.

Therefore, when supplying power to the batteries and systems from the interface including plural specs of abilities of supplying power, it is necessary to supply the power corresponding to the specs of the interface.

SUMMARY OF THE INVENTION

The present invention may provide a power circuit enabling power supply corresponding to a supplying current that substantially obviates one or more problems caused by the limitations and disadvantages of the related art.

Features and advantages of the present invention are presented in the description which follows, and in part will become apparent from the description and the accompanying drawings, or may be learned by practice of the invention according to the teachings provided in the description. Objects as well as other features and advantages of the present invention will be realized and attained by a power circuit particularly pointed out in the specification in such full, clear, concise, and exact terms as to enable a person having ordinary skill in the art to practice the invention.

To achieve these and other advantages in accordance with the purpose of the invention, an embodiment of the invention provides a power circuit which is connected to a power source having different capabilities of supplying current. The power circuit supplying driving power from the power source to a load includes a switching unit configured to switch the supply of the driving power supplied to the load in response to an external switching signal.

BRIEF DESCRIPTION OF THE DRAWINGS

Other objects and further features of the present invention will become apparent from the following detailed description when read in conjunction with the accompanying drawings, in which:

FIG. 4 is a graph indicating an operative waveform according to a second embodiment of the present invention;

FIG. 8 is a graph explaining the operation according to the second embodiment of the present invention.

DESCRIPTION OF THE PREFERRED EMBODIMENTS

In the following, embodiments of the present invention will be described with reference to the accompanying drawings.

Figure 1:
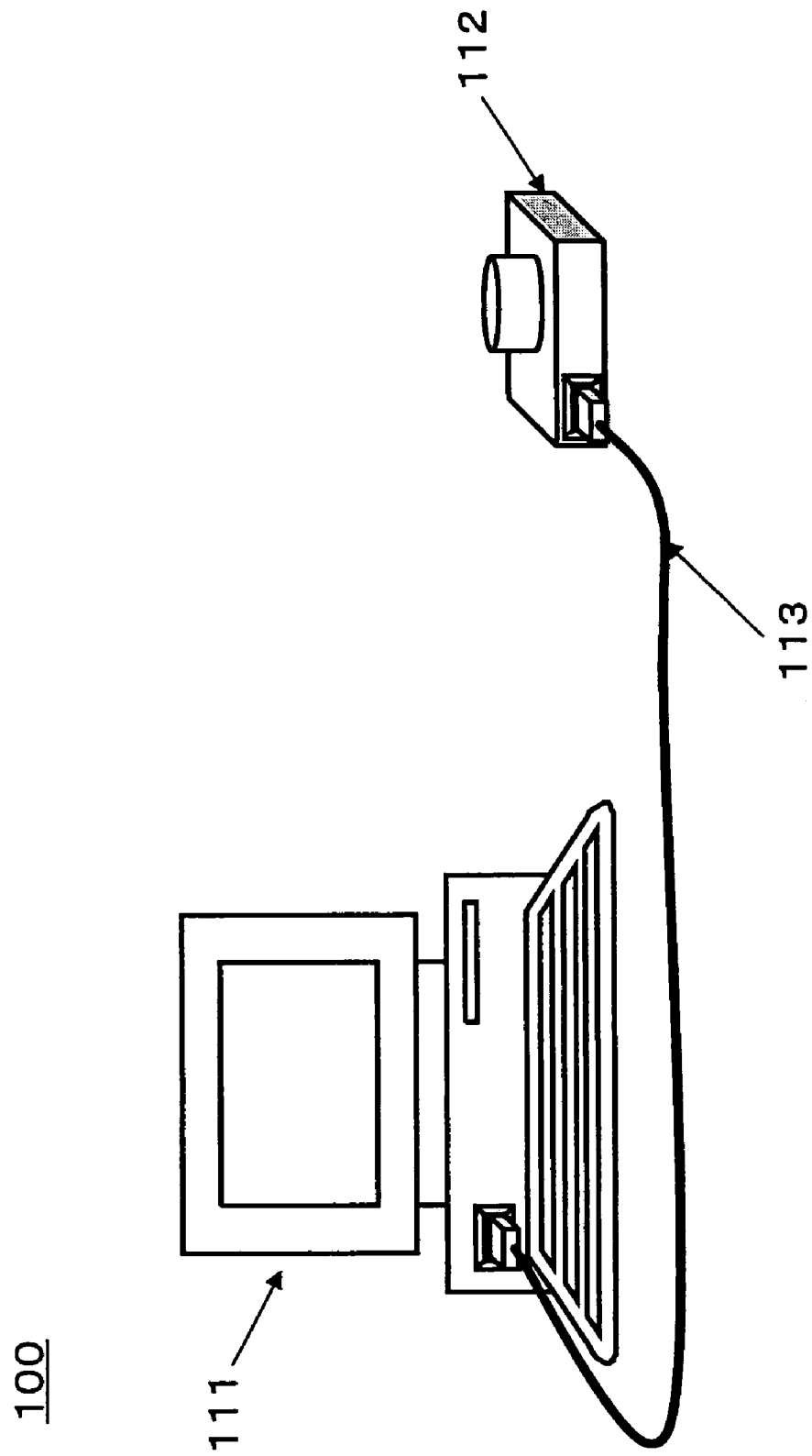
FIG. 1 is a view illustrating a configuration of a system according to a first embodiment of the present invention.

FIG. 1 is a view illustrating a configuration of a system according to a first embodiment of the present invention;

A system 100 is configured to include a personal computer 111 and an electric device 112 which are connected with each other via a USB cable 113.

Figure 2:
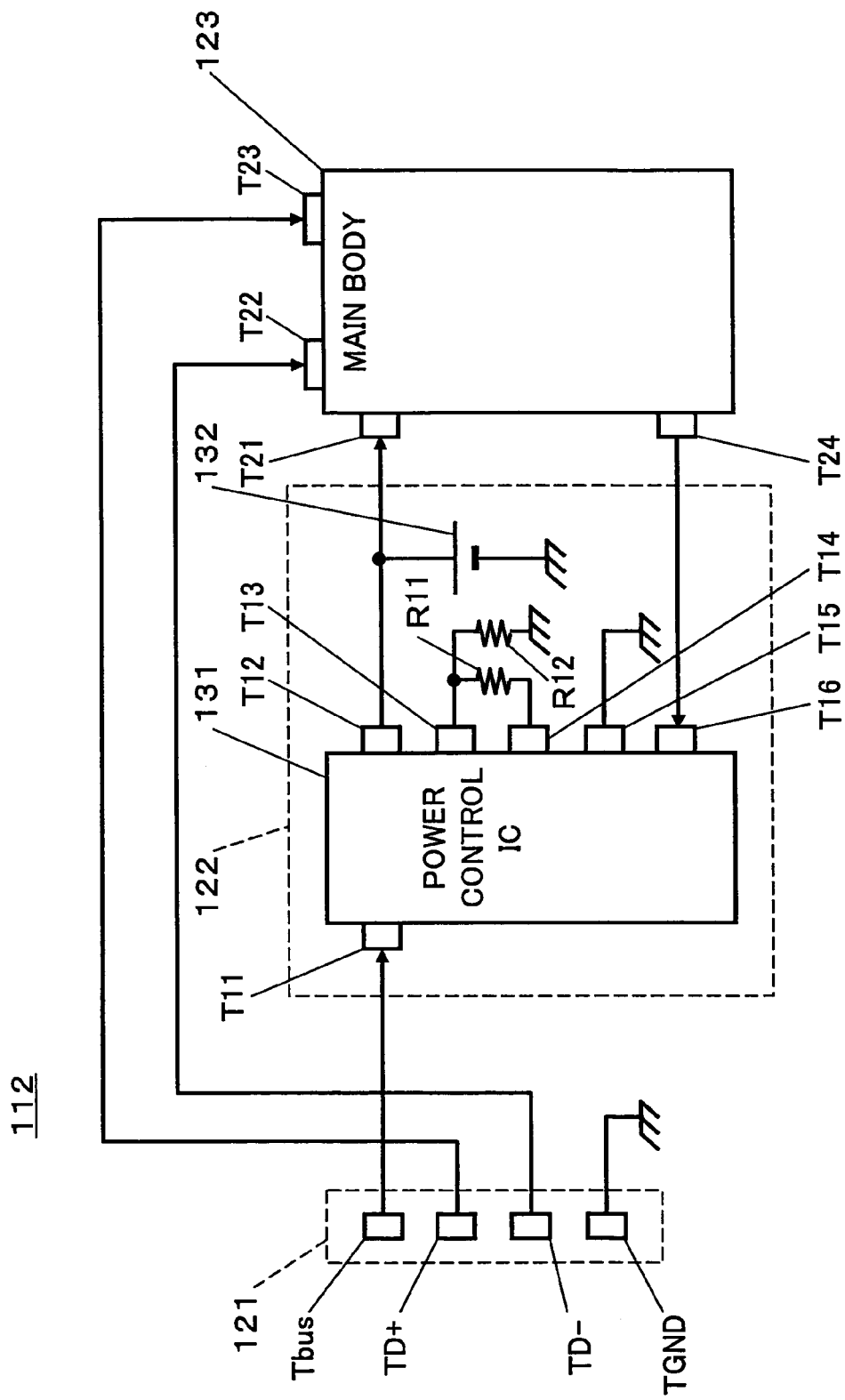
FIG. 2 is a block diagram of an electric device 112.

FIG. 2 is a block diagram of the electric device 112.

The electric device 112 includes a USB port 121, a power device 122 and a main body 123. The USB port 121 includes a USB socket connector to which a plug connector provided at an end of the USB cable 113 is connected. The USB port 121 includes terminals, Tbus, TD+, TD− and TGND.

A power line of the USB cable 113 is connected to the terminal Tbus. A non-inverting signal line of the USB cable 113 is connected to the terminal TD+. An inverting signal line of the USB cable 113 is connected to the terminal TD−. A grounding line of the USB cable 113 is connected to the terminal TGND.

Moreover, the terminal Tbus is connected to the power device 122. The terminal TD+ is connected to a terminal T23 of the main body 123. The terminal TD− is connected to a terminal T22 of the main body 123. The terminal TGND is grounded.

The power device 122 includes a power control IC 131, a battery 132, and resistors R11 and R12.

The power control IC 131 includes a terminal T11 to which 5 V of power voltage is applied from the terminal Tbus. The power control IC 131 generates 4.2 V of charging voltage based on the voltage applied to the terminal T11. The generated charging voltage is output from a terminal T12. The terminal T12 of the power control IC 131 is connected to the battery 132 and the main body 123 to charge the battery 132 and supply driving power to the main body 123.

The battery 132 configured to include, for example, a lithium-ion battery that is connected to the terminal T12 of the power control IC 131. Thus, the battery 132 is charged by a voltage from the terminal T12 of the power control IC 131. In addition, the battery 132 is connected to the main body 123 via the terminal T21 to supply driving power to the main body 123.

Figure 3:
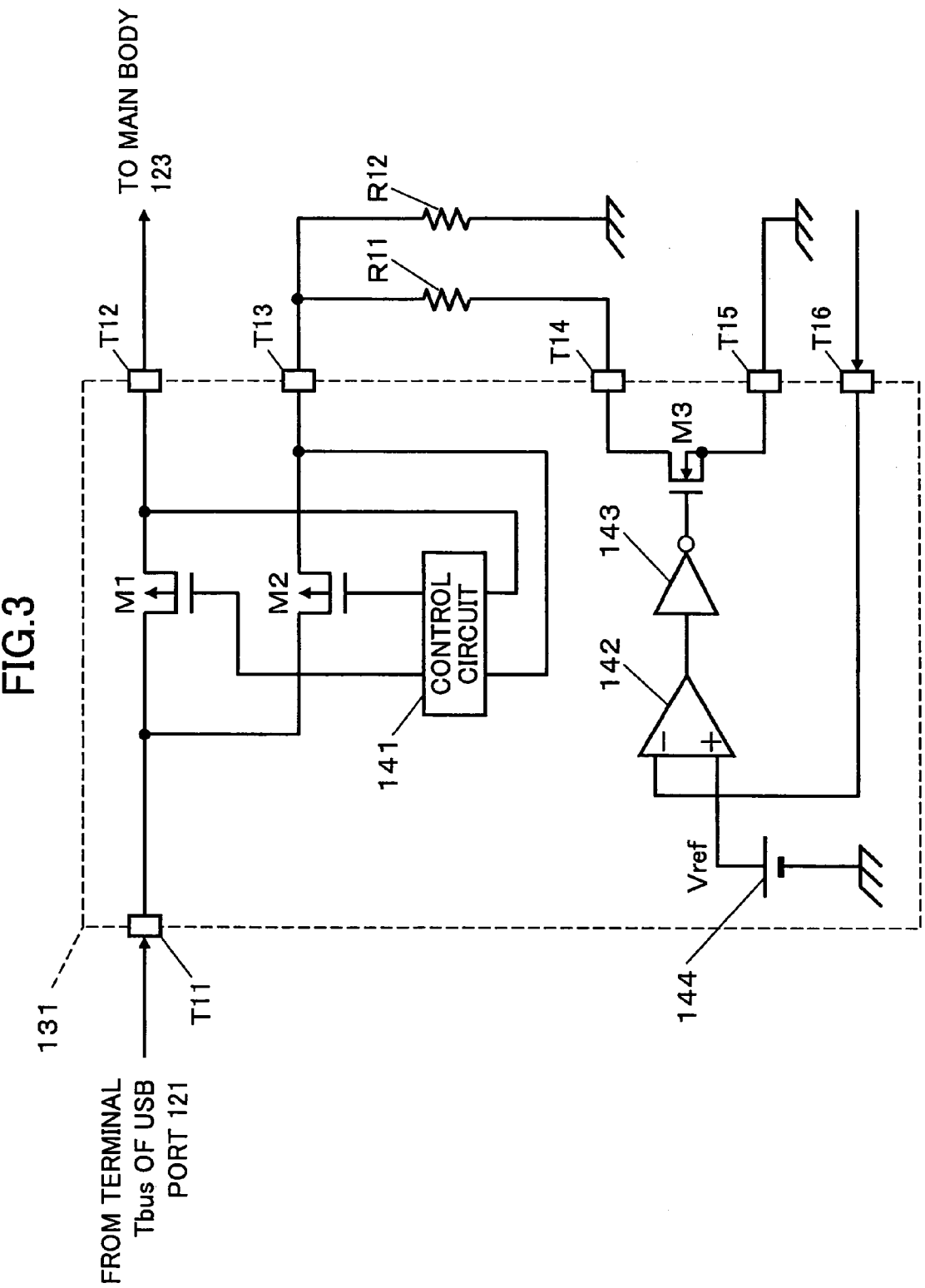
FIG. 3 is a block diagram of a power control IC 131.

FIG. 3 is a block diagram of the power control IC 131.

The power control IC 131 includes transistors M1 through M3, a control circuit 141, a comparator 142 and a drive circuit 143.

The transistor M1 is configured to include an N-channel MOS transistor. The drain and source are connected between the terminals T12 and T11. The gate is connected to the control circuit 141. The transistor M2 is configured to include an N-channel MOS transistor. The drain and source are connected between a terminal T13 and the terminal T11. The gate is connected to the control circuit 141.

The transistors M1 and M2 comprise a current mirror circuit. The current flowing in the transistor M1 is 10,000 times as large as the current flowing in the transistor M2.

The control circuit 141 connected to the terminal T12 detects a voltage of the terminal T12 and controls the transistor M1 so that the voltage of the terminal T12 is equal to a predetermined voltage, i.e., 4.2 V. In addition, the control circuit 141 is connected to the terminal T13. An end of the resistor R11 and an end of the resistor R12 are connected to the terminal T13. The other end of the resistor R11 is connected to a terminal T14 of the power control IC 131. The other end of the resistor R12 is grounded.

As for the transistor M3, in the power control IC 131, the source and drain are connected between the terminal T14 and a terminal T15. The gate is connected to the drive circuit 143. The terminal T15 is grounded in the power control IC 131.

A terminal T24 of the main body 123 is connected to a terminal T16. Thus, an electric current supply switching signal is supplied from the terminal T24 to the terminal T16. The terminal T16 is connected to a non-inverting input terminal of the comparator 142 in the power control IC 131.

A reference voltage Vref is supplied to the non-inverting input terminal of the comparator 142 from a reference voltage source 144. The comparator 142 compares the electric current supply switching signal supplied to the terminal T16 with the reference voltage Vref. If the electric current supply switching signal is larger than the reference voltage Vref, an output is set to low level. On the contrary, if the electric current supply switching signal is smaller than the reference voltage Vref, the output is set to high level. The electric current supply switching signal is set to high level when increasing the electric current supply. On the contrary, the electric current supply switching signal is set to low level when reducing the electric current supply. When the electric current supply switching signal is set to high level, the level becomes higher than the level of the reference voltage Vref. On the contrary, when the electric current power supply switching signal is set to low level, the level becomes lower than the level of the reference voltage Vref.

When the electric current supply switching signal is set to high level, the output of the comparator 142 becomes low level while the output of the drive circuit 143 becomes high level. When the output of the drive circuit 143 becomes high level, the transistor M3 is switched on. When the transistor M3 is switched on, since an end of the resistor R11 is grounded via the transistor M3, the terminal T13 is connected to a parallel circuit comprising the resistors R12 and R11.

Where the terminal T13 is connected to the parallel circuit comprising the resistors R11 and R12, a resistance between the terminal T13 and the ground becomes smaller than the resistance where only the resistor R12 is connected. Accordingly, more current flows through the transistor M2. Therefore, the electric current supply of the transistor M1 becomes high.

When the electric current supply switching signal is low level, the output of the comparator 142 becomes high level while the output of the drive circuit 143 becomes low level. When the output of the drive circuit 143 becomes low level, the transistor M3 is switched off. When the transistor M3 is switched off, the other end of the resistor R11 is released (not connected through the transistor M3). Thus, the terminal T13 is connected to only the resistor R12.

Where the terminal T13 is connected to only the resistor R12, the resistance between the terminal T13 and ground becomes larger than the resistance where the terminal T13 is connected to the parallel circuit comprising the resistors R11 and R12. Accordingly, the current flowing through the transistor M2 becomes small. Therefore, the electric current supply of the transistor M1 becomes small.

It should be noted that the transistor M3, the comparator 142, the drive circuit 143 and the reference voltage source 144 are configured as a resetting function by the signal supplied to the terminal T16.

[Operation]

FIG. 4 is a graph indicating an operative waveform according to the second embodiment of the present invention. FIG. 4(A) is a graph indicating a characteristic of a current output from the terminal T12. FIG. 4(B) is a graph indicating a change of the voltage of the terminal T16.

The control circuit 141 passes a slight current I1 in the runup to a normal current supply at a time t1 when the USB cable 113 is connected to the USB port 121. As shown in FIG. 4(B), the electric current supply switching signal becomes low level, supplied from the terminal T24 of the main body 123 to the terminal T16 of the control circuit 141. Accordingly, the transistor M3 is switched off. As the transistor M3 is switched off, the other end of the resistor R11 is released. Thus, only the resistor R12 is connected between the terminal T13 and ground. Therefore, the maximum supply current from the terminal T12 to the battery 132 and the terminal T21 is regulated to a smaller current I2, e.g., 100 mA. For example, when a USB interface is used, the maximum supply electric current is at most 100 mA.

The control circuit 141 regulates the transistors M1 and M2 so that the current at a time t2 corresponds to the electric current supply switching signal. At this time, the main body 123 obtains information such as the electric current supply by a descriptor.

When the main body 123 recognizes, for example, that the electric current supply at a time t2 is 500 mA, as shown in FIG. 4(B), the main body 123 sets the supply electric current switching signal to high level, supplied from the terminal T24 to the terminal T16 of the control circuit 141. Accordingly, the transistor M3 is switched on. When the transistor M3 is switched on, the resistors R11 and R12 are connected in parallel between the terminal T13 and ground. Therefore, the maximum supply electric current from the terminal T12 to the battery 132 and the terminal T21 is regulated to a larger current I3, e.g., 500 mA. For example, when the USB interface is used, the electric current supply is set at most 500 mA. Accordingly, the battery 132 can be charged at high speed.

When the charge of the battery 132 becomes substantially full at a time t3, the control circuit 141 gradually reduces the current output from the terminal T12 so that the current becomes substantially I4 at a time t4. It should be noted that if an electric current is supplied to the main body 123, the charging state is unchanged. At this time, the current supplied to the main body 123 is controlled to be optimum in a range between I1 and I3.

Second Embodiment

Figure 5:
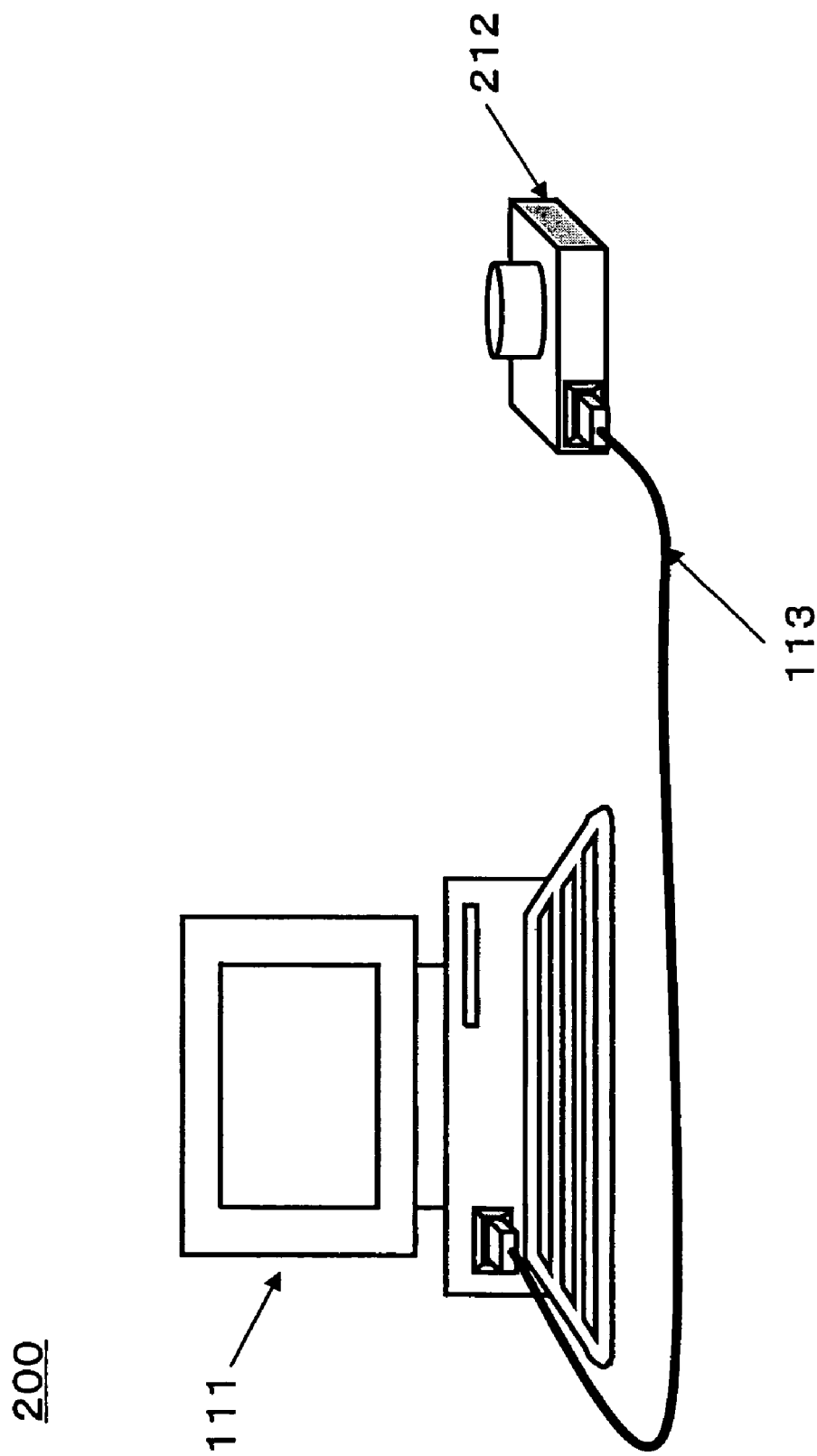
FIG. 5 is a view illustrating a system configuration according to the second embodiment of the present invention.
Figure 6:
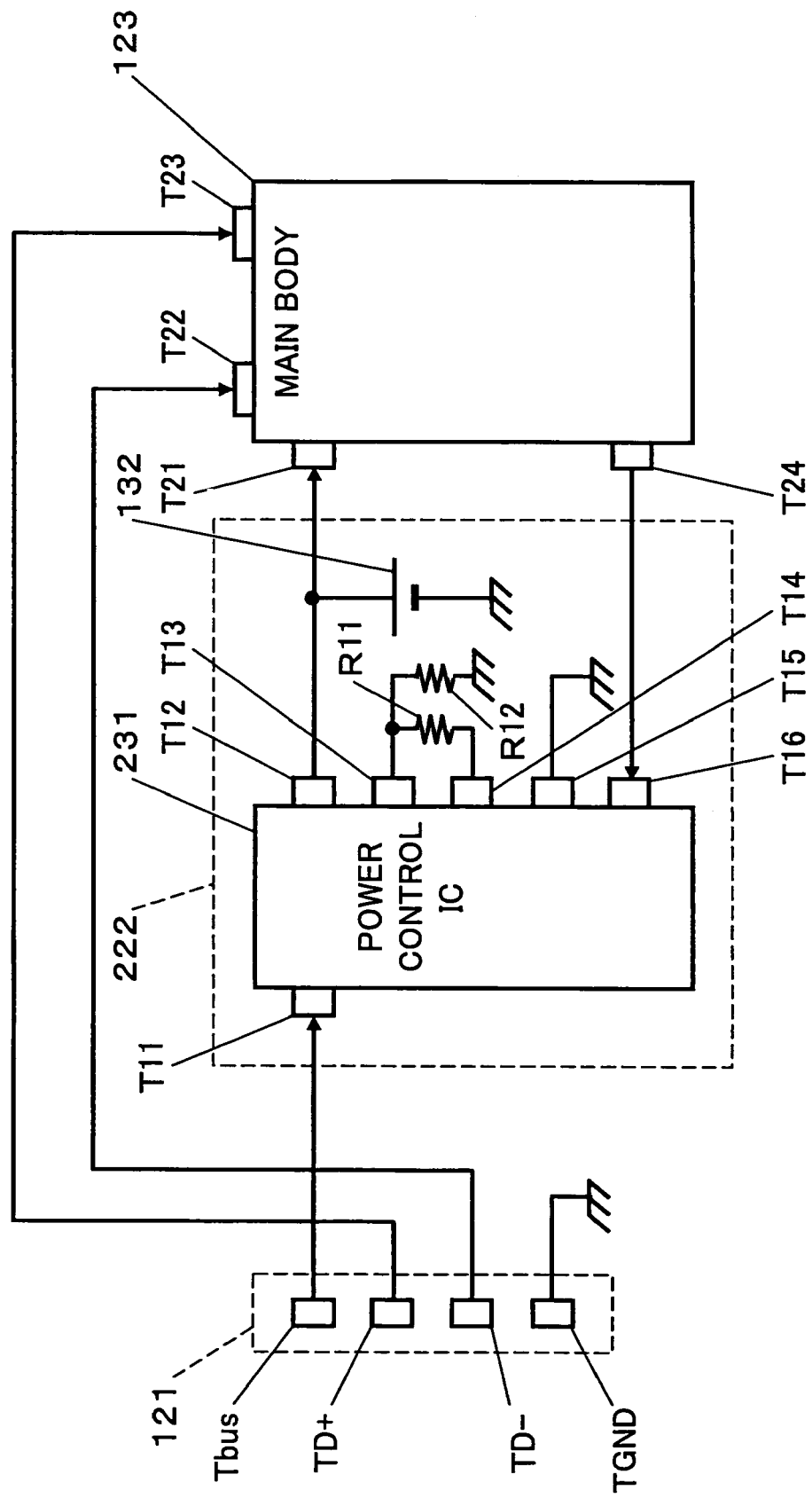
FIG. 6 is a block diagram of an electric device 212.
Figure 7:
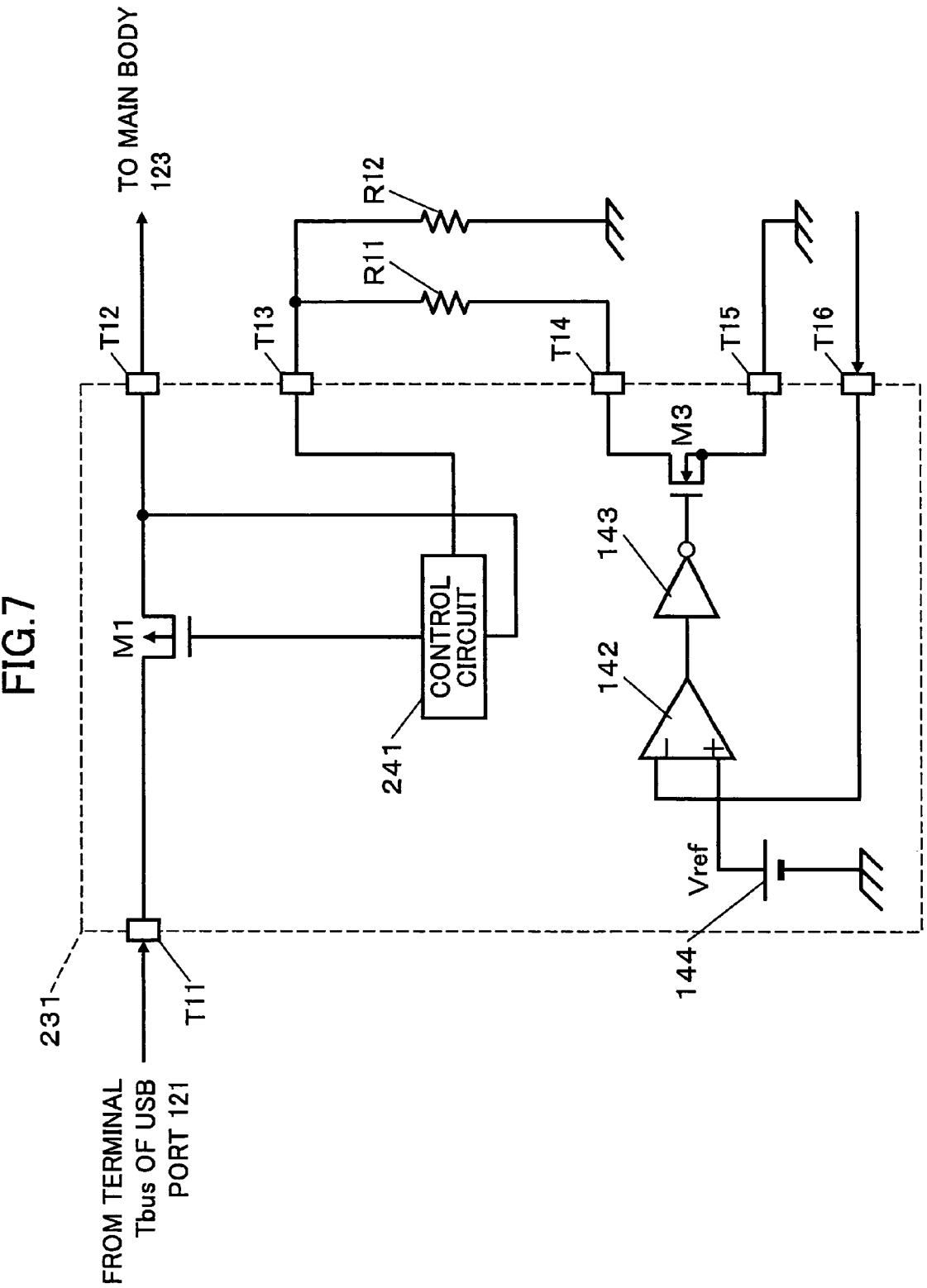
FIG. 7 is a block diagram of a power control IC 231.

FIG. 5 is a view illustrating a system configuration according to a second embodiment of the present invention. FIG. 6 is a block diagram of an electric device 212. FIG. 7 is a block diagram of a power control IC 231.

A system 200 of the present embodiment is different from the system 100 of the first embodiment in the configuration of an electric device 212. The electric device 212 of the present embodiment is different from the electric device 112 of the first embodiment in the configuration of a power control IC 231.

The power control IC 231 of the present embodiment is configured to include a terminal T13 connected to a control circuit 241. The transistor M2 is omitted. The control circuit 241 applies a voltage to the terminal T13 and controls the gate voltage of the transistor M1 corresponding to the current flowing through the terminal T13 and controls the voltage of the terminal T12 so as to enable switching the output voltage.

It should be noted that in the present embodiment, the output voltage can be adjusted by the external resistors R11 and R12.

The main body 123 supplies a voltage switching signal from a terminal T24 to a terminal T16 of the power control IC 231. The voltage switching signal becomes low level when increasing the output voltage, while the voltage signal becomes high level when reducing the output voltage.

FIG. 8 is a graph explaining the operation according to the second embodiment of the present invention. FIG. 8(A) is a graph indicating a voltage of the terminal T12. FIG. 8(B) is a graph indicating a voltage of the terminal T16.

The control circuit 241 gradually increases the output voltage by controlling the transistor M1 when the USB cable 113 is connected to the USB port 121 at a time t11. Moreover, the voltage switching signal becomes low level as shown in FIG. 8(B), supplied from the terminal T24 of the main body 123 to the terminal T16 of the control circuit 241. Accordingly, the transistor M3 is switched off. As the transistor M3 is switched off, the other end of the resistor R11 is released. Thus, only the resistor R12 is connected between the terminal T13 and the ground. Therefore, the output voltage of the terminal T12 becomes equal to, for example, 4.2 V at a time t12.

As shown in FIG. 4(B), the main body 123 sets the voltage switching signal to high level, supplied from the terminal T24 to the terminal T16 of the control circuit 241 in order to, for example, drive the main body 123 by the battery 132 at a time t13. The control circuit 141 switches the transistor M3 on when the supply electric current switching signal becomes high level. As the transistor M3 is switched on, the resistors R11 and R12 are connected in parallel between the terminal T13 and ground. Accordingly, the voltage of the terminal T12 is reduced to 4.1 V. Therefore, the current is supplied from the battery 132 to the main body 123.

[Others]

In the present embodiment, a description is given of a USB interface as the interface, but the present invention is not limited to this case. Another interface can also be used.

In the present embodiment, a description is given of the configuration switching the current and voltage, but it is also possible to control an enabling function of the power control IC by using a resetting function obtained by controlling the signal supplied to the terminal T16 from the transistor M3, the comparator 142, the drive circuit 143 and the reference voltage source 144.

In addition, by the resetting function, a timer can be run which is provided for timing when detecting an abnormal condition. By the resetting function, an LED can be driven in order to display a state. Further, by the resetting function, a function of controlling a battery voltage at a predetermined value can be switched on and off. Moreover, the output of the above described resetting function can be either active high or active low.

According to at least one of the embodiments of the present invention, supplying the driving power is equal to supplying an electric current.

According to at least one of the embodiments of the present invention, the power source is a power line of a USB interface. The switching unit switches a driving current in response to whether the USB interface is set to the self power mode or to the bus power mode.

According to at least one of the embodiments of the present invention, switching the supplying of the driving power is performed by an applied voltage.

According to at least one of the embodiments of the present invention, a battery is charged by the power source.

According to at least one of the embodiments of the present invention, the supplying of the current of the switching unit is set by an external resistor.

According to the above described embodiments of the present invention, the supplying of the driving power to the load is switched by the switching unit in response to the external switching signal. Accordingly, even if a power source such as a USB interface including a different spec of for supplying the current is connected, the supplying of the driving power is set optimum in response to the supplying of the current of the power source.

Further, the present invention is not limited to these embodiments, but variations and modifications may be made without departing from the scope of the present invention.

The present application is based on Japanese Priority Application No. 2005-075920 filed on Mar. 16, 2005 with the Japanese Patent Office, the entire contents of which are hereby incorporated by reference.

What is claimed is:

1. A power circuit connected to a single power source having different capabilities of supplying current, said power circuit supplying driving power from the single power source to a load, comprising a switching unit configured to adjust levels of output current of the single power source supplied to the load in response to one external switching signal on only a single external control line, and wherein:

the power source is a power line of a USB interface, and wherein the switching unit switches a driving current in response to whether the USB interface is set to a first power mode or to a second power mode, wherein in the second power mode a driving current is supplied larger than that in the first power mode.

2. The power circuit as claimed in claim 1, wherein supplying the driving power is equal to supplying an electric current.

3. The power circuit as claimed in claim 1, wherein the switching of supplying the driving power is performed by an applied voltage.

4. The power circuit as claimed in claim 1, wherein a battery is charged by the power source.

5. The power circuit as claimed in claim 2, wherein a capability of supplying current is set by an external resistor.

* * * * *